(12) United States Patent
Rimchala et al.

(10) Patent No.: US 12,530,916 B2
(45) Date of Patent: Jan. 20, 2026

(54) MULTIMODAL MULTITASK MACHINE LEARNING SYSTEM FOR DOCUMENT INTELLIGENCE TASKS

(71) Applicant: Intuit Inc., Mountain View, CA (US)

(72) Inventors: Tharathorn Rimchala, San Francisco, CA (US); Peter Lee Frick, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 1009 days.

(21) Appl. No.: 17/589,370

(22) Filed: Jan. 31, 2022

(65) Prior Publication Data
US 2023/0245485 A1 Aug. 3, 2023

(51) Int. Cl.
| | |
|---|---|
| *G06V 30/413* | (2022.01) |
| *G06N 3/084* | (2023.01) |
| *G06V 30/10* | (2022.01) |
| *G06V 30/412* | (2022.01) |

(52) U.S. Cl.
CPC ........... *G06V 30/413* (2022.01); *G06N 3/084* (2013.01); *G06V 30/10* (2022.01); *G06V 30/412* (2022.01)

(58) Field of Classification Search
CPC .... G06V 30/413; G06V 30/10; G06V 30/412; G06N 3/084
See application file for complete search history.

(56) References Cited

U.S. PATENT DOCUMENTS

| | | | | |
|---|---|---|---|---|
| 11,275,934 | B2 * | 3/2022 | Reisswig | G06V 30/414 |
| 2006/0047690 | A1 * | 3/2006 | Humphreys | G06F 40/295 |
| | | | | 707/999.102 |
| 2011/0182500 | A1 * | 7/2011 | Esposito | G06V 30/413 |
| | | | | 382/159 |
| 2020/0097768 | A1 * | 3/2020 | Freese | H04L 9/085 |
| 2021/0073533 | A1 * | 3/2021 | Ast | G06N 20/00 |
| 2021/0149993 | A1 | 5/2021 | Torres | |
| 2021/0303939 | A1 * | 9/2021 | Hu | G06V 10/25 |
| 2022/0366168 | A1 * | 11/2022 | Kaur | G06F 40/295 |

FOREIGN PATENT DOCUMENTS

| | | | | |
|---|---|---|---|---|
| EP | 3920044 A1 * | 12/2021 | | G06F 16/355 |
| EP | 3923185 A2 * | 12/2021 | | G06F 40/216 |

OTHER PUBLICATIONS

Pramanik et al., Towards a multi-modal, multi-task learning based pre-training framework for document representation learning, arXiv preprint arXiv:2009.14457 (Year: 2020).*

(Continued)

*Primary Examiner* — Shahid K Khan
(74) *Attorney, Agent, or Firm* — Lathrop GPM LLP

(57) ABSTRACT

Multimodal multitask machine learning system for document intelligence tasks includes a feature extractor processing token values obtained from a document to obtain features, and a token extraction head classifying, using the features, the token values to obtain classified tokens. The classified tokens are aggregated into entities. A document classification model is executed on the features to classify the document and obtain a document label prediction. Further a confidence head model applying the document label prediction processes the entities to obtain a result.

10 Claims, 9 Drawing Sheets

(56) References Cited

OTHER PUBLICATIONS

Zheng, Xuanang, et al. "Span-based Joint Extracting Subjects and Objects and Classifying Relations with Multi-head Self-attention." 2021 IEEE 9th International Conference on Information, Communication and Networks (ICICN). IEEE, 2021 (Year: 2021).*

Xu, Yiheng, et al. "Layoutlm: Pre-training of text and layout for document image understanding." Proceedings of the 26th ACM SIGKDD international conference on knowledge discovery & data mining. (Year: 2020).*

Xu, Yang, et al. "Layoutlmv2: Multi-modal pre-training for visually-rich document understanding." arXiv preprint arXiv:2012.14740 (Year: 2020).*

Pramanik, S., et al., "Towards a Multi-modal, Multi-task Learning based Pre-training Framework for Document Representation Learning", Sep. 30, 2020, 8 pages.

Xu, Y., et al, "LayoutLMV2: Mutli-Modal Pre-Training for Visually-Rich Document Understanding", May 11, 2021, 16 pages.

Powalski, R., et al., "Going Full-Tilt Boogie on Document Understanding with Text-Image-Layout Transformer", Jul. 12, 2021, 18 pages.

Appalaraju, S., et al., "DocFormer: End-to-End Transformer for Document Understanding", Sep. 20, 2021, 22 pages.

Liu, X., et al., "Multi-Task Deep Neural Networks for Natural Language Understanding", May 30, 2019, 10 pages.

Sanh, V., et al., "DistilBERT, a Distilled Version of BERT: Smaller, Faster, Cheaper and Lighter", Mar. 1, 2020, 5 pages.

Touvron, H., et al., "Training Data-Efficient Image Transformers and Distillation through Attention", Jan. 15, 2021, 22 pages.

Torres, T., et al., "Document Understanding: Information Extraction from Financial Documents and Forms", Mar. 25, 2020, 29 pages.

* cited by examiner

MULTIMODAL MULTITASK MACHINE LEARNING SYSTEM FOR DOCUMENT INTELLIGENCE TASKS

BACKGROUND

Automatic data extraction is complex because computers do not "read" documents in a similar manner to humans. Namely, computers, which operate on encodings, cannot simply look at a document and gather the pertinent information. Data extraction is even more complex when the document type of the document is unknown. For example, in the financial sector, whether a document is a bill, an invoice, a receipt, or a donation acknowledgement letter has implications on the data that can be extracted from the document. To perform data extraction, computers apply heuristics in the form of machine learning models to the documents. A problem exists in improving the accuracy of such computer automated data extraction using models.

SUMMARY

In general, in one aspect, one or more embodiments relate to a method that includes processing, by a feature extractor, token values obtained from a document to obtain features, classifying, by a token extraction head using the features, the token values to obtain classified tokens, and aggregating the classified tokens into entities. The method further includes executing a document classification model on the features to classify the document and obtain a document label prediction; and processing, by a confidence head model applying the document label prediction, the entities to obtain a result.

In general, in one aspect, one or more embodiments relate to a system that includes a feature extractor executing on a computer processor for processing token values obtained from a document to obtain features, a token extraction head executing on the computer processor for classifying, using the features, the token values to obtain classified tokens, a token aggregator executing on the computer processor for aggregating the classified tokens into entities, a document classification model executing on the computer processor for classifying, using the features, the document to obtain a document label prediction, and a confidence head model executing on the computer processor for processing, by applying the document label prediction, the entities to obtain a result.

In general, in one aspect, one or more embodiments relate to a non-transitory computer readable medium comprising computer readable program code for causing a computer system to perform operations. The operations include processing, by a feature extractor, token values obtained from a document to obtain features, classifying, by a token extraction head using the features, the token values to obtain classified tokens, and aggregating the classified tokens into entities. The operations further include executing a document classification model on the features to classify the document and obtain a document label prediction; and processing, by a confidence head model applying the document label prediction, the entities to obtain a result.

Other aspects of the invention will be apparent from the following description and the appended claims.

DETAILED DESCRIPTION

Figure 1:
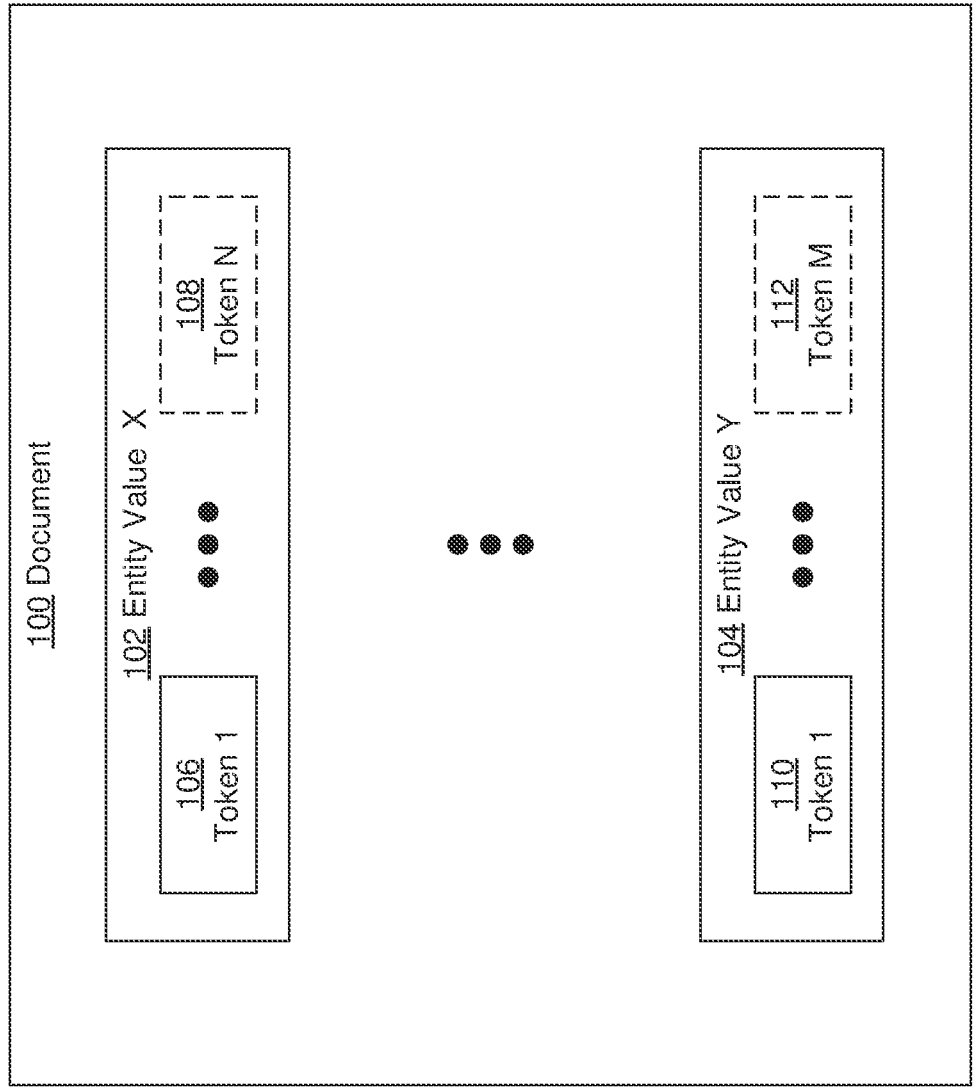
FIG. 1 shows a diagram of a document in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention are directed to data extraction from documents using machine learning models. Documents have content to be extracted. Further, documents may be of various types. Thus, to extract content from the heterogeneous documents, one or more embodiments have a particular arrangement of machine learning models. The machine learning models are arranged in a multi-task setup such that learnable features of the document are extracted from raw documents and then simultaneously fed into a token classifier head and a document classification model. The token classifier head classifies individual textual tokens into different token types. The document classification model is a machine learning model that determines the document type of document (e.g. receipts, bill, donation letter, etc.). A trainable confidence head combines the output of the token extraction head and the document classification model to process the extracted content based on the document type prediction. Thus, the machine learning models are trained to generate classified content that is for a particular document type.

The arrangement of the machine learning models creates a single end-to-end architecture for the related tasks of document classification and key information extraction of target documents. Further, the same token extraction head may be used for multiple related documents, which is possible because the extraction outputs are combined with the output from the classification head at inference time.

From a training standpoint, one or more embodiments have a new task consistency confidence loss in which the conditional routing loss only considers the document type specific subset of expected entities, derived from the predicted document type by the classification output head. Further, the training efficiency of the overall machine learning system is increased, because one or more leverage the relationship between tasks (e.g., document classification and key information extraction) to constrain the model parameter optimization, thus enhancing the training efficiency of the overall machine learning system.

FIG. 1 shows a diagram of a document (100) in one or more embodiments. As shown in FIG. 1, the document (100)

contains entity values (e.g., entity value X (102), entity value Y (104)). Entity values are the content of the document that is the target of the extraction. Namely, the goal of content extraction of a document is to extract the entity values from the document and associate the entity values with an entity identifier to form an entity. Thus, an entity is an entity value, entity identifier pair. The entity identifier relates the entity value to the type of information represented by the entity value. The entity with the entity identifier, entity value pair may be referred to as a field-value pair, key-value pair or other pair that relates a value to the information defining what the value represents. For example, if the extracted content is to be stored in a relational database, the entity identifier is the attribute, and the entity value is the attribute value that is stored.

Entity values (e.g., entity value X (102), entity value Y (104)) in the document (100) may be composed of one or more token values (e.g., entity value X token 1 (106), entity value X token N (108), entity value Y token 1 (110), entity value Y token M (112)). A token value is often an individual word or term within a sentence or phrase. In some examples, the token value may be punctuation characters, special characters (e.g., monetary symbol) or other character or collection of characters produced by a tokenization process.

In one or more embodiments, the input document obtained by the system is a document image. A document image is a document in an image file format. In the image file format, the computer encoding of content in the document encodes the location of colors of pixels rather than character or word encoding. For example, the original document may be a scanned version of the document.

In one or more embodiments, the original document includes a character encoding. However, the characters in the document may be unassociated with what the characters represent. For example, numbers may be unassociated with that which the numbers represent. Similarly, words or letters may be unassociated with the information represented by the words or numbers.

In some embodiments, the input document (100) is a financial document. The financial document may be any document that includes financial information. Some examples of the financial document include a receipt, a tax document (e.g., W2), a bank statement, a balance sheet, a cash flow statement, a profit and loss statement, etc. The financial document may include text that may indicate financial values and information, names of business entities, date, address, codes and symbols, etc.

In one or more embodiments, the document may be a structured document. A structured document may comprise a plurality of pre-defined fields. Each field is a particular location of an entity value, such as relative to the document dimension. Examples of structured documents may include standardized forms. The input text token values may be derived from the financial document based on the pre-defined fields. The structure of the structured document may be unknown to the system. For example, while the structured document may follow a template, the template may be unknown to the overall system. Thus, the association of the entity value with the entity identifier may be unknown based on the structured document.

In one or more embodiments, the document (100) may be an unstructured document. In an unstructured document, the entity values may appear in nondeterministic locations within the document. Examples of unstructured documents include letters, contracts, variable length receipts, etc.

Figure 2:
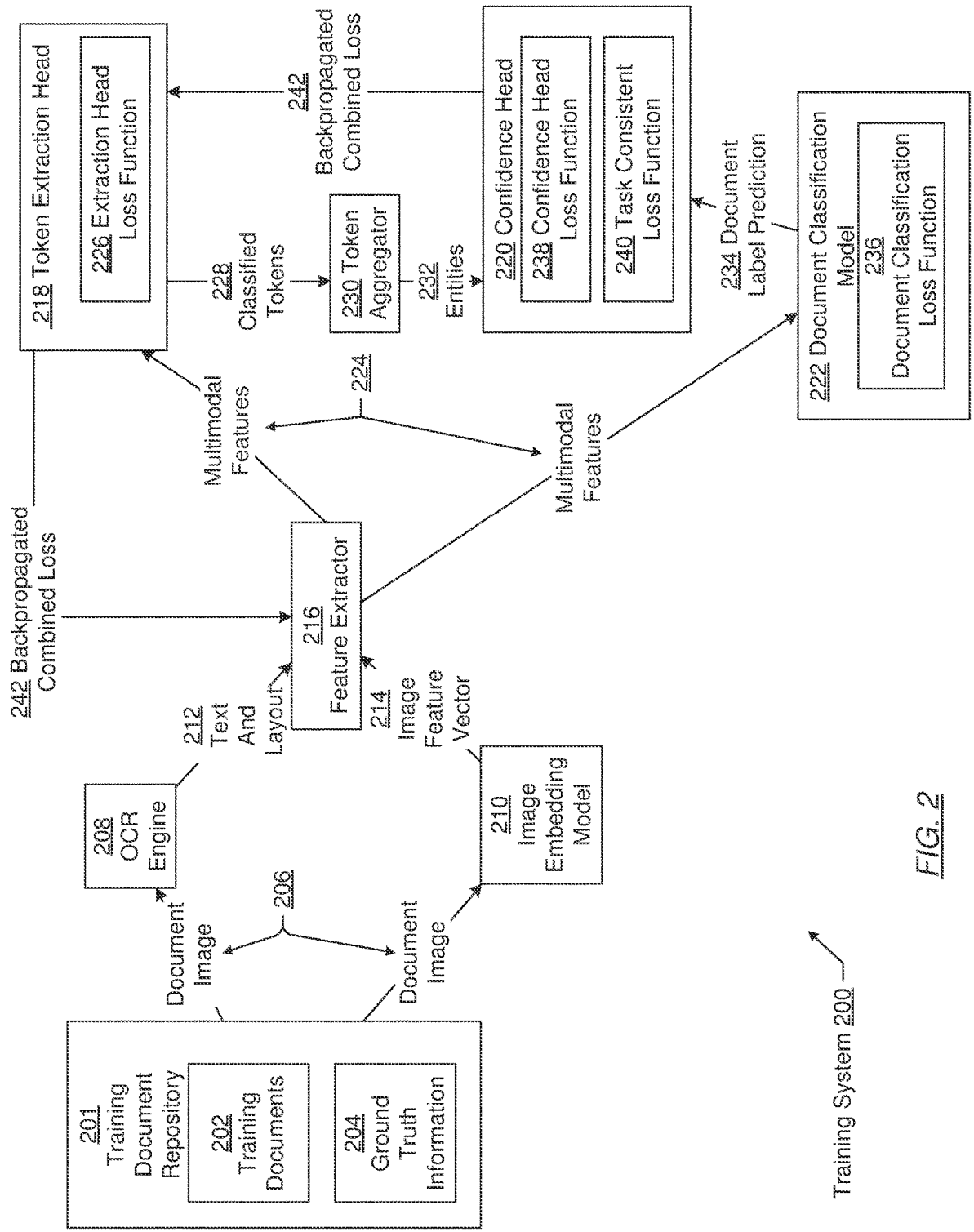
FIG. 2 shows a diagram of a training system in accordance with one or more embodiments.

FIG. 2 shows a diagram of a training system (200) in accordance with one or more embodiments. The training system (200) is a system used to train the machine learning models. The training system (200) may be the same computing system or a different computing system than the production system (shown in FIG. 3).

As shown in FIG. 2, the training document repository (201) is a data repository for storing training data. A data repository, in general, is any type of storage unit, device, or storage structure for storing data. In the training data repository (200), the training data includes training documents (202) and ground truth information (204). Training documents (202) are documents that are each associated with corresponding ground truth information (204). For a particular training document, the corresponding ground truth information includes a correct document label of the corresponding training document, and entity identifiers that are each associated with the corresponding entity value in the corresponding training document. The document label is an identifier of the document type of the training document. Thus, the ground truth information is deemed correct extracted content from the corresponding training document. Ground truth information may be information extracted by a human review of the document.

If the training document is a document image, the document image (206) may be transmitted to an Optical Character Recognition (OCR) engine (208). The OCR engine is a visual based model that is trained to detect text from the image formatted document (e.g., electronic/scanned copy or a hard copy format or mobile captured images) and generate output including machine encoded text. In some examples, specialized software may be used to convert scanned images of text to electronic text that may enable searching, indexing and/or retrieval of digitized data. In some example embodiments, OCR engine (208) may be developed and optimized for extracting data from business/financial documents, tax documents, checks, invoices, bank statements, insurance documents, and/or alike. The OCR engine (208) may be trained and optimized by processing data sets of scanned documents and/or images. In some examples, the OCR engine (208) may be implemented by one or more processors.

The OCR engine may identify text as a linear sequence of individual characters with corresponding character bounding boxes from the document. Then, a tokenizer partitions the linear sequence of characters into sub-word pieces, words or terms. The tokenization process may convert the characters into token values. The token values may be useful semantic units for further processing. The tokenization is performed by locating word boundaries (e.g., ending point of a word and beginning point of the next word) in a piece of text. In some examples, the tokenization process may discard certain characters (e.g., punctuation, etc.).

The output of the OCR engine (208) includes text and positional information (212) of the document image (206). The text includes the token values and information about the location of the token values in the document image. The positional information includes the bounding boxes around all the tokens in the document image.

The document image (206) may also be transformed into an image feature vector by an image embedding model (210). The image embedding model (210) is configured to generate image feature vector (214) obtained by mapping the raw input images (i.e., document images) using a pre-trained model used for document image classification. The image embedding model (210) may be a trained convolutional neural network (CNN) model that is trained to classify document images into predefined categories of a particular domain (e.g., classify financial document images into particular types of documents). An example of a CNN model architecture that may be used is MaskRCNN. Other CNN architectures may be used without departing from the scope of the invention. In one or more embodiments, the output of the fully connected layer of the CNN is the image feature vector (214) produced by image embedding model (210).

Continuing with FIG. 2, the OCR engine (208) and the image embedding model (210) are connected to a machine learning framework that includes at least a feature extractor (216), a token extraction head (218), a confidence head (220), and a document classification model (222). Each of these components are described individually below after the overall machine learning framework is described.

Turning to the machine learning framework, the machine learning framework implements a layoutLMv2 model having a repeated stack of transformer's encoder layers each of which encodes bidirectional representations from the multimodal inputs (e.g., text, layout, and image) in one or more embodiments. An output of an encoder block may be used as features for downstream tasks (for example, token extraction, confidence head, document classification).

The input to the machine learning framework is the text and layout (212) and the image feature vector (214) in or more embodiments. The text and layout is input to an embedding process that converts the token values into word embeddings. The word embeddings may be vectors of real numbers. For example, token values in the phrase "700 shares of ACME . . . " are converted into corresponding vectors (X1, X2, X3, X4, . . . ). The word embeddings are then utilized by the encoder as input. The size of the vectors (size of X1, X2, . . . ) may be constant. In some examples, the size of the vectors that are input or output from different encoders and/or decoders may be fixed. In some examples, the size of a word embedding vector may be a configurable parameter.

The machine learning processes of the example embodiments operate on vectors of real values instead of strings of plain texts. In addition to being more amenable to the machine learning processes disclosed by the example embodiments, the real-valued vectors enable operation on a vector space with reduced dimension. In other words, the space spanned by the vectors representing the token embeddings have a much lower dimensionality compared to the space spanned by the actual token values and hence it is much easier to perform the machine learning processes on the vectors.

The encoder portion of the transformer model may include a stack of encoders. An output of a first encoder layer in the encoders may be an input of a second encoder layer. Similarly, an output of a first decoder layer may be an input of a second decoder layer. In some examples, the number of encoders may be the same or different from the number of decoders. The encoder(s) may each include a feed forward neural network (NN) sublayer and a self-attention sublayer. The self-attention sublayer enables the encoder to consider other positions of an input sequence when processing a given position of the input sequence. For example, the other positions may be non-contiguous to the position that is being processed. The outputs of the self-attention sublayer may be fed to the feedforward NN sublayer. In the example embodiments, the same structure of the feedforward NN sublayer may be used in all encoder layers of an encoder block.

Returning to the embodiment shown in FIG. 2, the feature extractor (216) implements an encoder portion of the transformer model described above. In one or more embodiments, a feature extractor (216) is configured to obtain at least the text of the document. In the embodiment shown in FIG. 2, the feature extractor (216) is configured to receive the text and layout (212) from the OCR engine (208) and the image feature vector (214) from the image embedding model (210). However, other configurations of the training system (200) may be used. For example, the feature extractor may be directly connected to the training document repository and obtain the training document directly, such as when the training document is in text encoding. The feature extractor (216) is configured to generate features from the input. When the feature extractor (216) encodes text, layout, and an image feature vector, the resulting features extracted are referred to as multimodal features (224). Namely, multimodal refers to the property that the features are from different modes of the document (e.g., layout, image, text), whereby each mode conveys meaning.

In one or more embodiments, the feature extractor (216) is implemented using a LayoutLMv2 model. LayoutLMv2 includes multiple encoder layers, the number of which may vary based on the model size. The output of the encodings may be feature embeddings that may be input to downstream tasks which may have similar decoder structures of the transformer model.

The LayoutLMv2 model enables contextual embedding of the input token values, wherein the embedding of a word may consider the context in which the word appears including the layout of the overall document and the document image. For example, without contextual awareness, the word "plane" would be represented by the same embedding in the following sentences: "The plane took off at nine in the morning", "The plane surface is a must in baseball" and "Plane geometry is an interesting area" even though the meaning of "plane" changes based on the context. Additionally, the LayoutLMv2 not only uses the existing masked visual-language modeling task but also the new text-image alignment and text-image matching tasks in the pre-training stage, where cross-modality interaction (e.g., the relationship between layout, text, and image) is better learned. Thus, LayoutLMv2 also implements a spatial-aware self-attention mechanism into the Transformer model, so that the transformer model can learn to associate the relative positional relationship among different text blocks. The input of each modality is converted to an embedding sequence and fused by the encoder. LayoutLMv2 is described in Xu, Y., Xu, Y., Lv, T., Cui, L., Wei, F., Wang, G., . . . & Zhou, L. (2020). LayoutLMv2: Multi-modal pre-training for visually-rich document understanding. arXiv preprint arXiv:2012.14740.

Example embodiments may be implemented using one of multiple architectures for the LayoutLMv2 models. The plurality of architectures may include a LayoutLMv2 BASE model in which the number of encoder layers may be set to a first number (e.g., 12) and a LayoutLMv2 LARGE model in which the number of encoder layers may be set to a second number larger than the first number (e.g., the second number may be set to 24). The feedforward NNs employed by the encoder layers in the LayoutLMv2 model (for example shown as feedforward NN sublayer of encoder in the context of transformers) may have a large dimension (width) of hidden layers (in some examples 768 hidden layers for LayoutLMv2 BASE model and 1024 hidden dimension for LayoutLMv2 LARGE model). The attention layer may be multi-headed as described in the transformer model and in some examples, the number of attention heads may be 12 and 16 for the LayoutLMv2 BASE model and the LayoutLMv2 LARGE model, respectively. The LayoutLMv2 transformer may use a bidirectional self-attention model enabling the encoder to incorporate context (e.g., text tokens) from both left and right directions.

The first token among the tokens that are input to the LayoutLMv2 may be a special token referred to as [CLS] (e.g., standing for classification). Similar to the transformer model, LayoutLMv2 may take a sequence of tokens as input which may keep flowing through the stack of the encoder layers. Each layer may apply self-attention and may pass the results through a feed-forward network, and then may hand the results off to the next encoder. Each position in the output of the encoder outputs a vector of size hidden dimension. In some example embodiments, the value of hidden size may be 768. The hidden dimension is determined by the output dimension of the self-attention (SA) sublayer multiplied by the number of self-attention heads (e.g. BASE: 64 SA output size×12 heads=768 hidden size, LARGE: 64 SA output size×16 heads=1024 hidden size, etc.). In some examples, the output corresponding to the first position (e.g., position of the [CLS] token) may be input to a downstream task (e.g., classifier).

The LayoutLMv2 model may be a pre-trained model of a stack of encoders. In some examples, the corpus used for the pre-training may be unsupervised (unlabeled) and/or non-task-specific and without dependence on the downstream tasks. In some examples, the pre-training may use task specific corpus to adapt the model for downstream tasks. The pre-trained LayoutLMv2 model may be used for encoding the inputs to the feature extractor (216) to generate multimodal features (224) having token embeddings. The token embeddings may be used as input to a token extraction head (218) and a document classification model (222). The token extraction head (218), and a document classification model (222) may have similar structure of decoder blocks described in the context of the transformers, wherein each model comprises one or more decoder layers. A decoder layer may employ a feedforward neural NN sublayer and may additionally have self-attention and/or encoder-decoder attention sublayers. In some examples, the decoders used for the token extraction head (218) and a document classification model (222) may be linear decoders employing a linear neural network model. A linear neural network uses a linear transfer function, wherein an output of the network is a linear function of its input.

The token extraction head (218) is configured, through training, to classify each token value of the extracted content to generate classified tokens (228). Classified tokens (228) are token values that are each assigned a token label identifying the type of information in the token value. A token, or classified token, is a combination of token value and token label. For example, consider the scenario in which an entity value is a street address. The token values in the entity value may identify a particular street number, one or more street names, and type of roadway (e.g., street, drive, lane, avenue, etc.). The token labels, in the example, identify the token values as a street number, one or more street names, type of roadway (e.g., street, drive, lane, avenue, etc.), or other type of information (e.g., person name, monetary amounts, etc.).

In one or more embodiments, the token labels are a predefined set of token labels. The token extraction head (218) classifies each token value into the predefined set of token labels by identifying the corresponding probability that the token value belongs to each token label. In one or more embodiments, the predefined set includes the superset of token labels for the various document types processed by the system. Thus, the output of the token extraction head (218) is a set of probabilities, whereby the token value is assigned a token label of the set having the greatest probability.

As discussed above, the token extraction head (218) is trained using a supervised training process. As such the token extraction head (218) includes or is connected to an extraction head loss function (226) to generate an extraction loss. In one or more embodiments, the extraction head loss function (226) is a multi-class cross entropy loss function. The cross entropy losses function measures the difference between (average number of information theoretic bits required to represent an input training data point x from) a predicted $\hat{P}$ vs. groundtruth probability distribution $P^{true}$. In multiclass classification model optimization, cross entropy loss can be expressed as the summation over each class (i.e., each token label), the probability of the token label belonging to the class in the ground truth information multiplied by a function (e.g., logarithmic function) of the probability of the token label belonging to the class in the prediction (e.g., output of the token extraction head) multiplied by negative one. If the ground truth information assigns the token value to a single class, then the cross entropy loss is negative one multiplied by the function of the probability of the token label belonging to the correct class in the prediction. The extraction head loss function (226) calculates the summation of the cross entropy loss over all tokens in the training document to obtain a total loss.

The classified tokens (228) are passed to a token aggregator (230). The token aggregator (230) is configured to aggregate tokens into entity values using a set of rules applied over the sequence of predicted tokens classifier outputs. The set of rules may use the predicted token labels of the tokens, the order of appearance of the token values in the original document with respect to each other (e.g., adjacency, etc.), and other information about the tokens. For example, token values that are adjacent and assigned the same or similar token labels may be grouped by the token aggregator. Token values in the group may be ordered according to the order in the original document. In one or more embodiments, tokens concatenated together into an entity.

The token aggregator (230) may further infer an entity label to each predicted entity. In one or more embodiments, the entity label is assigned based on the token labels of the tokens.

For example, in one or more embodiments, the token labels in a set of token labels are the same as the entity labels in the set of entity labels. In such an example, tokens are grouped when the token values have the same token label and are adjacent. The same token label becomes the assigned entity label for the group of tokens. By way of an example, the first three digits of a social security number (SSN), second two digits of the SSN, and last four digits of an SSN may each be assigned the same token label of "SSN". Based on adjacency and having the same token label, the tokens are grouped as an ordered set into an entity, which is then assigned the entity label "SSN".

In other embodiments, different token labels are assigned to different tokens, which are then grouped by the token aggregator (230) into an entity having the same single token label based on a rule defining the particular grouping.

Continuing with FIG. 2, the multimodal features (224) are also passed to a document classification model (222). The document classification model (222) is configured to generate a document label prediction (234). The document label prediction (234) is a unique identifier of the document type of the document and, optionally, a corresponding document label probability. The document type refers to the type of contents in the document. For example, the document type may be bill, invoice, tax return form, W-2 form, application, contract, or other document type.

The document classification model (222) classifies each document into the predefined set of document labels by identifying the corresponding probability that the document belongs to each document label. Thus, the document classification model (222) may generate a set of probabilities. The output of the document classification model (222) may be a document label prediction (234) having a document label in the set having the greatest document label probability, and the document label probability thereof. The document label prediction (234) may alternatively or additionally include the set of document label probabilities that has a corresponding document label probability for each document label in the predefined set of document labels. If the output of the set of document label probabilities, the set may be filtered to remove zero probabilities or any probability that is less than a prespecified threshold.

Similar to the token extraction head (218), the document classification model (222) is also trained using a supervised training process. As such, the document classification model (222) is connected to a document classification loss function (236) that generates a document classification loss. In one or more embodiments, the document classification loss function (236) is a multi-class cross entropy loss. In the case of the document classification model (222), the document label probability assigned to the document label prediction (234) is compared against the training document label that is in the ground truth which is expressed computationally via the multi-class cross entropy loss function. The same multi-class cross entropy loss function may be used for both the extraction head and the document classification model. Alternatively, different loss functions may be used. Further, the loss functions for either model may be different than cross entropy loss, such as multiclass Kullback Leibler (KL) loss without departing from the scope of the disclosure.

The confidence head (220) assigns a probability of exact match prediction to each predicted entity. Namely, for each entity, the confidence head outputs the probability that the entity value (derived from token classification and token aggregation) matches the ground truth. In one or more embodiments, the probability is based on exact match (i.e., character by character). The confidence head (220) may be a neural network model whereby the target is a match or non-match (i.e., a binary value). The output of the confidence head (220) is the class match or non-match, with the probability of each class. Thus, the probability of match, is determined by the soft-argmax (normalized logits of the raw confidence head outputs). The confidence head model may use a sigmoid activation function to generate the probability. The confidence head (220) is trained to determine the accuracy of prediction using a supervised training objective to compute the loss (238). Because the target outcome is match or non-match (binary classification), a binary cross entropy loss function may be used. The binary cross entropy loss compares the probabilities assigned by the confidence head (220) to the target of whether the entity has a match or non-match prediction as assigned by the token classification output head followed by the token aggregator (230). Across the entities in an entire document, a summation of the binary cross entropy loss may be used as the confidence loss.

The confidence head (220) can be modified to account for task consistency (240). The task consistent loss function (240) is a combination, for each entity, of the confidence loss from the confidence head loss function (238), the document label probability in the document label prediction, and a binary value that is dependent on whether the entity label of the entity is in the document type corresponding to the document label. As discussed above, each document type has types of entities that may be present in the document type. Conversely, some types of entities may not be present in the document type. For example, a receipt may have the last digits of a credit card number whereas a bill does not have any digits of a credit card number. Thus, for each document type, the task consistent loss function (240) is determined by a mapping repository that relates each document label corresponding to a document type to the set of entity labels of the entity types that may be in the document type. Given an entity and a document type predicted by the document classification model, the task consistent loss function (240) evaluates to zero if the entity label assigned to the entity is not related in the mapping repository to the document label output by the document classification head, and to a nonzero number if and only if 1) entity label is not related to the document label and 2) the predicted entity value is a non-match.

The task consistent loss function (240) may calculate an individual task consistent loss for each entity. For example, the task consistent loss function may be a product of the confidence loss, the document label probability, and an indicator function that evaluates to zero when the entity label is not related to the document label and one when the entity label is related to the document label. The output of the task consistent loss function is a task consistent confidence loss for the entity. In one or more embodiments, if the document classification head outputs a set of document label probabilities for multiple document labels, then the task consistent confidence loss may be a sum, over the document labels, of a product of the confidence loss, the document label probability for the document label, and a binary value that is zero when the entity label is not related to the document label and one when the entity label is related to the document label. In equation form, equation Eq. 1 as follows may be used.

$$\Sigma_d [CE(g^*_i, g_i) \times \text{Prob}(y^{doc}_i = d) \times \mathbb{1}(e,d)] \quad \text{(Eq. 1)}$$

where $\text{Prob}(y^{doc}_i = d) = \text{Softmax}(y^{*doc}_{i,d})$
and $g_i(y^*\text{enti}, y\text{enti}) = (y^*\text{enti} = y\text{enti})$ according to groundtruth
and $g^*_i(y^*\text{enti}, y\text{enti})$ is the confidence head prediction of exact-match vs. non-match
and $\mathbb{1}(e,d) = 1$ iff $e \in E_d$ otherwise 0

In Eq. 1, CE stands for CrossEntropy; the indicator function (i.e., "$\mathbb{1}(e, d)$") specifies whether entity e is a target entity for document label d and the document label probability (i.e., "$\text{Prob}(y^{*doc}_i)$") weighs the loss for each entity. Further, "*" is the prediction. Thus, $y^*\text{enti}$ is the prediction of the label for the entity and $y\text{enti}$ is the ground truth value for the label.

Continuing with FIG. 2, as discussed above, the outputs of the token extraction head (218), aggregator (230), and confidence head (220) are interrelated. For example, the output of the aggregator is an entity label assigned to each entity value and the confidence head (220) may determine the loss for the entity labels associated with each entity value established by the aggregator. The parameters of the LayoutLMv2 model, the token extraction head (218) and the confidence head (220) may, therefore, be jointly optimized. During the training phase, the parameters of the entire network including the LayoutLMv2 model, the token extraction head and the confidence head respective models may also change through the gradient based optimization. The act of taking a pre-trained model and adapting it to downstream tasks is known as fine-tuning. The fine-tuning process in example embodiments may take a linear combination of extraction loss, task consistent confidence loss, and the document classification loss to generate a combined loss. The gradient of the combined loss is back-propagated (242) through the entire network consisting of the confidence head (220), token extraction head (218). Thus, the neural network parameters are iteratively updated through the fine tuning steps.

Figure 3:
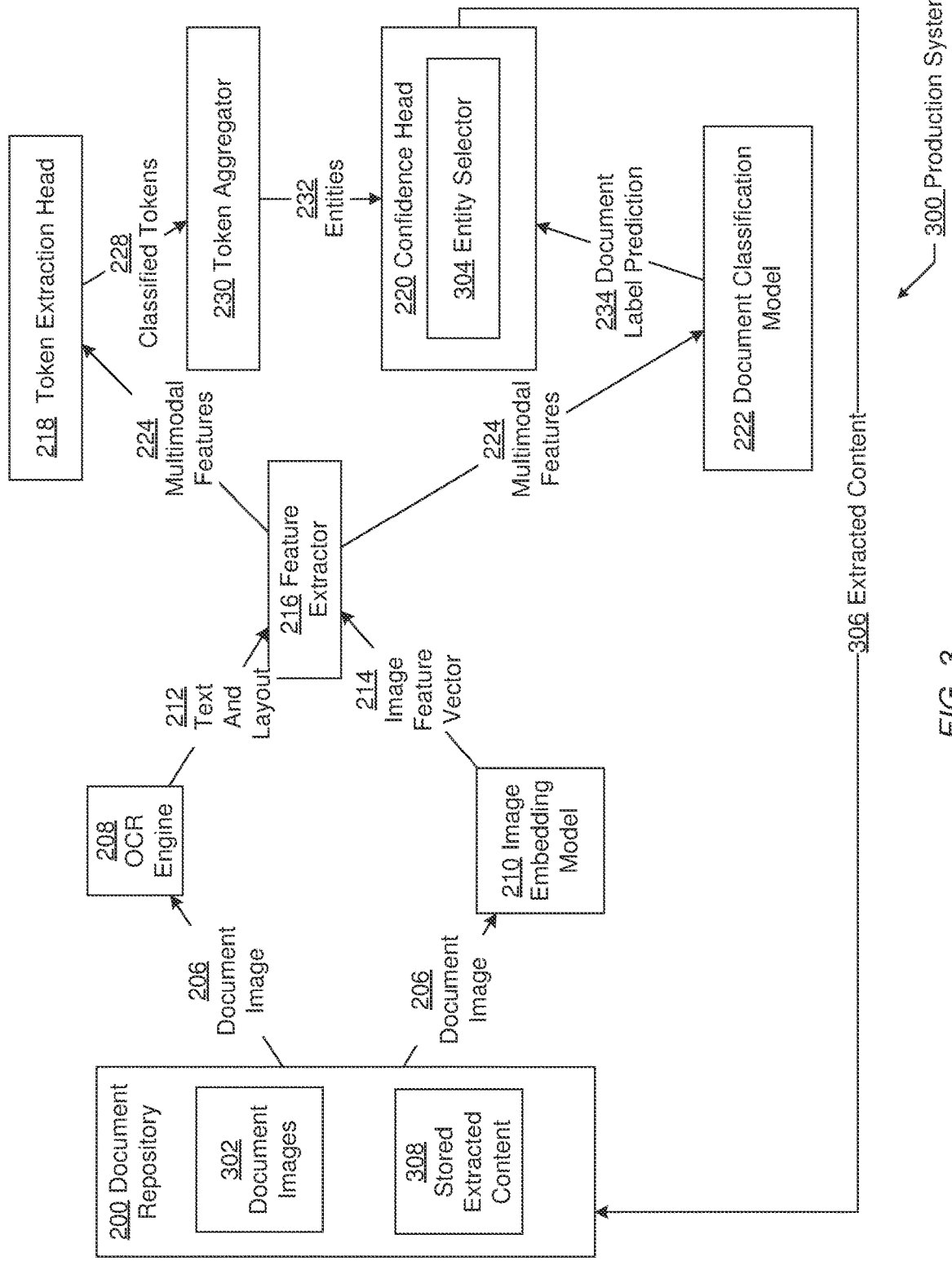
FIG. 3 shows a diagram of a production system in accordance with one or more embodiments.

When the models are deemed trained, such as by satisfying a convergence criterion, the system may be deployed to a production system. The production system may be the same or different computer system than the training system (200). FIG. 3 shows a diagram of a production system (300) in accordance with one or more embodiments.

Turning to FIG. 3, like reference numbers are used for the same elements as shown in FIG. 2. The like numbered components shown in FIG. 3 may be deemed trained versions of the like numbered components shown in FIG. 2. Continual training may optionally be performed resulting in additional components which are not shown in FIG. 3.

In FIG. 3, the document images (302) are the target document images for extracting entities. For example, the document images (302) may be image formatted versions of documents that are of heterogeneous document types. For example, a user may scan or take pictures of a variety of documents and not bother labeling what each document is. The production system (300) is configured to extract the entities as extracted content (306) from the various document images (302).

The operations of the production system (300) may be the same or similar to the operations of the training system (200), without the training. For example, a document image (206) from the document repository (200) may be passed to an OCR engine (208) that outputs text and layout (212), and an image embedding model (210) that outputs and image feature vector (214). The feature extractor (216) may take as input one or more of the text, layout, and image feature vector (214) to generate features. The features may be multimodal features (224) if image features and layout are also used. The features may be transmitted to a document classification model (222) that classifies the document and generates a document label prediction (234). The features are also passed to the token extraction head (218) that generates classified tokens (228) for input to the token aggregator (230). The token aggregator (230) outputs entities to the confidence head (220).

The confidence head determines the probability that the entity value is accurately labeled. In the production system (300), the confidence head (220) includes or is connected to an entity selector (304). The entity selector (304) is configured to determine, for each entity, whether to output the entity based on whether the entity label is related, in the mapping repository, to the document type of the predicted document label in the document label prediction. The confidence head (220) may output the entities of the document in extracted content (306). In the extracted content, one or more of the entities may be related to a unique document identifier of the document image.

In one or more embodiments, the extracted content (306) is stored in the data repository (200) as stored extracted content (308). In the stored extracted content (308), the formatting of the entities may be changed based on the data structure of the storage. For example, extracted content (306) may be entity value, entity label pairs while the stored extracted content (308) is in a relational database.

While FIGS. 1-3 shows a configuration of components, other configurations may be used without departing from the scope of the invention. For example, various components may be combined to create a single component. As another example, the functionality performed by a single component may be performed by two or more components.

Figure 4:
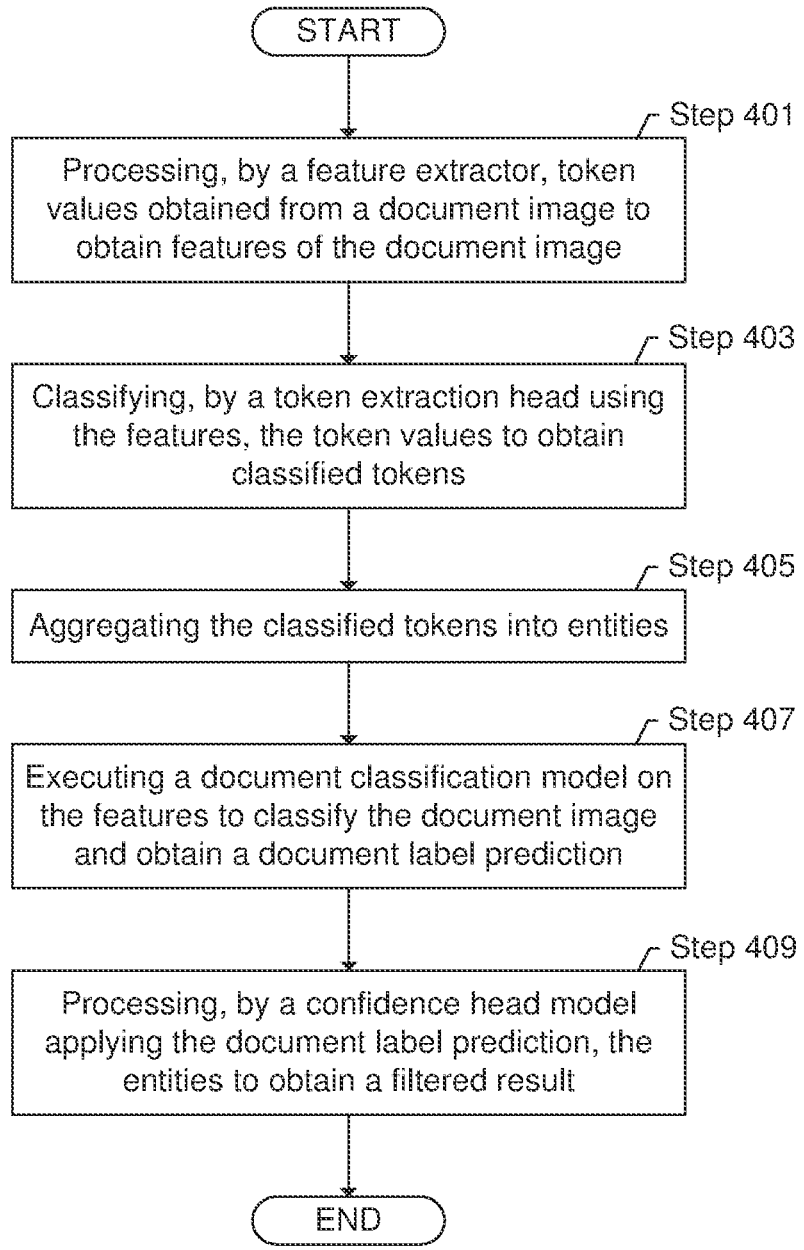
FIG. 4 shows a general flowchart in accordance with one or more embodiments.
Figure 5:
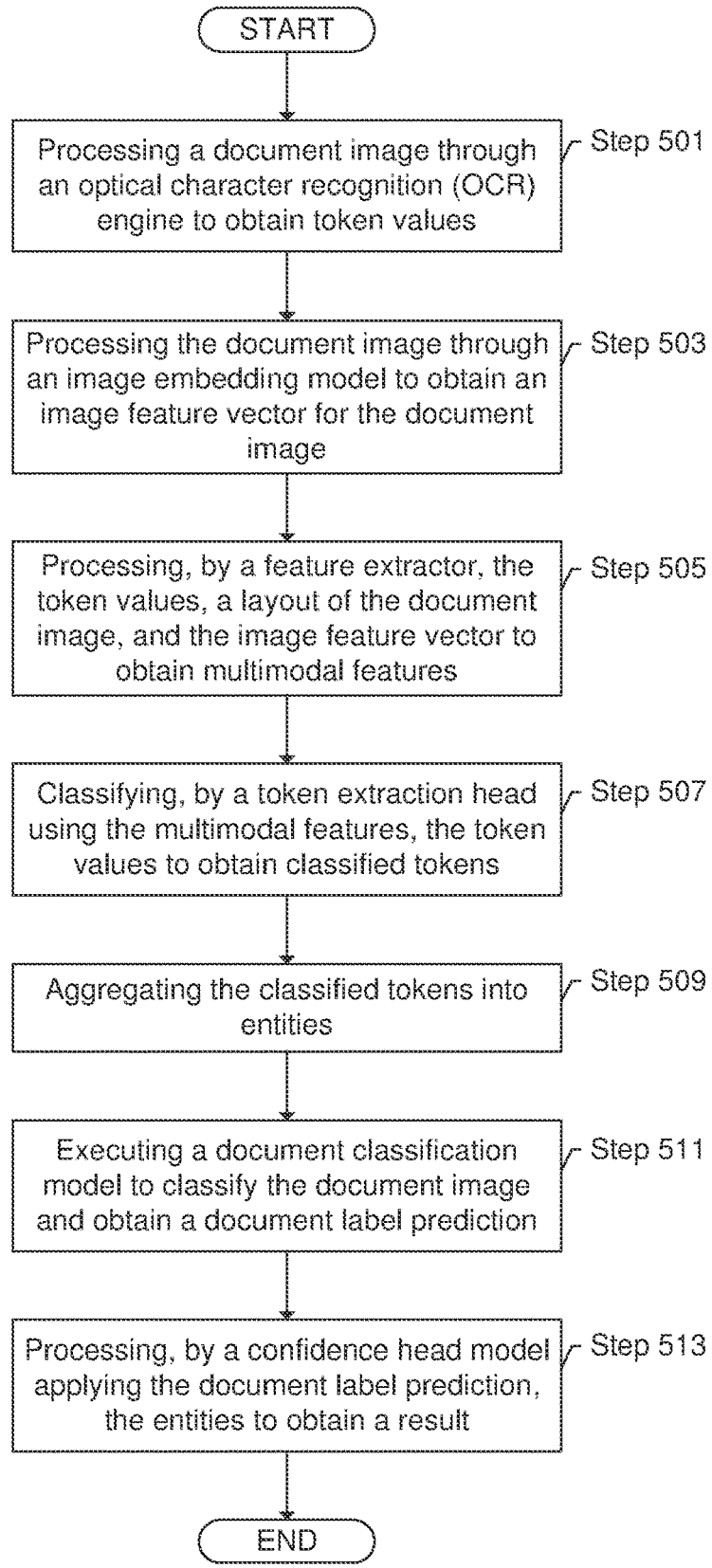
FIG. 5 shows a detailed flowchart in accordance with one or more embodiments.

FIGS. 4 and 5 show flowcharts in accordance with one or more embodiments. FIG. 4 shows a general flowchart that may be used for training or production, while FIG. 5 shows a more detailed flowchart. While the various steps in these flowcharts are presented and described sequentially, at least some of the steps may be executed in different orders, may be combined or omitted, and some of the steps may be executed in parallel. Furthermore, the steps may be performed actively or passively.

Turning to FIG. 4, in Step 401, a feature extractor processes token values obtained from a document image to obtain features of the document image. The feature extractor takes the output of the OCR engine, which includes text and bounding boxes identifying the location of the text. A tokenizer may group individual characters into words. The feature extractor processes the text to obtain a feature vector for the text. If the feature extractor uses multimodal input, then the output features are multimodal features. The result of the feature extraction is multimodal features for each token value.

In Step 403, the token extraction head classifies, using the features, the token values to obtain classified tokens. The token extraction head processes the features on a per token value basis to obtain a probability for each possible token label to which the token value should be assigned. The token value is assigned the token label having the greatest probability. The process is performed for each token value in the document. If the operations of FIG. 4 are performed during training, then a loss function is calculated by comparing the predicted classified tokens with the ground truth information discussed above with reference to FIG. 2 to obtain extraction (token classification) loss.

In Step 407, the classified tokens are aggregated into entities. Tokens that are adjacent or consecutive are aggregated based on one or more rules. The rules may specify a number, type or set of tokens that are grouped based on the corresponding token labels and relative locations to each other. The rules may also specify an entity label to apply to the tokens. The token aggregator may apply the rules to the tokens using the locations of the tokens in the document image to group the tokens into entity values, and then apply the entity label to the group and form entities.

In Step 407, a document classification model is executed on the features to classify the document image and obtain a document label prediction. The document classification model executes as a neural network classifier using the features to determine the probability that the document is correctly assigned to each document label. The document label prediction may be the set of probabilities, where an individual probability exists in the set for each of multiple document labels. The document label prediction may also or alternatively include a predicted document label and corresponding probability, whereby the predicted document label is the document label having the greatest probability. If the operations of FIG. 4 are performed during training, then a loss function is calculated by comparing the document label prediction with the ground truth information discussed above with reference to FIG. 2 to obtain the document classification loss.

In Step 409, the confidence head model applies the document label prediction to process the entities and obtain a result. In one or more embodiments, the processing is performed on a per entity basis. As discussed above, the confidence head model has a mapping repository that maps each document label to the possible entity labels of entity types that may be in the document type corresponding to the document label. Thus, if any entity from Step 407 has an entity label that is not mapped to the document label in the mapping repository, the entity and document label combination is excluded from the result.

During training, the result is a task consistent loss. The removed entity document label combination is not "task consistent" because the entity does not match the document type of the document label. Therefore, the removed entity document label combination does not substantively contribute to the task consistent confidence loss that is calculated. Specifically, the contribution is weighted by the probabilities over the document classes.

During production operations, when new document images are processed, the result is the extracted content. In one or more embodiments, only the single predicted document label is considered. The processing thus filters any entities output by the token aggregator that are mapped to the predicted document label in the mapping repository. Because the removed entities, that are removed through the filtering, do not belong to the document type of the predicted document labels, the removed entities do not make sense based on the type of document. Thus, the extracted content does not include the removed entities. In some embodiments, an alert, such as through a popup or other notification may be presented to the user, to give the user an option to specify an entity label, provide a correction, or override the filtering.

FIG. 5 shows a more detailed diagram. In Step 501, a document image is processed through an OCR engine to obtain token values and token bounding boxes. The OCR engine analyzes the pixels of the document image and detects the characters that the set of pixels represent. The OCR engine encodes the identified characters into a character encoding and produces OCR output. The OCR engine may include a segmentation engine. The segmentation engine may be configured to segment the document image in order to detect text lines or bounding boxes around groups of text. The segmentation engine may be performed as a preprocessing operation, during, or postprocessing operation to the character recognition. Thus, the output of the OCR engine is the sequence of characters and the corresponding character bounding boxes.

In Step 503, the document image is processed through an image embedding model to obtain an image feature vector for the document image. The pixel values are processed to classify document images into predefined categories of a particular domain (e.g., classify financial document images into particular types of documents). An example of a CNN model architecture that may be used is MaskRCNN. In one or more embodiments, the output of the fully connected layer in the image embedding model is the image feature vector.

In Step 505, the feature extractor processes the token values, the layout of the document image and the image feature vector to obtain multimodal features. In one or more embodiments, a LayoutLMv2 model is executed on the token values, layout, and image feature vector to obtain multimodal features.

In Step 507, the token extraction head classifies, using the multimodal features, the token values to obtain classified tokens. The token extraction head may perform similar operations discussed above with reference to FIG. 4. With multimodal features, the features are richer in information and therefore result in more accurate classified tokens.

In Step 509, the classified tokens are aggregated into entities. Aggregating the tokens into entities may be performed as discussed above with reference to Step 405 of FIG. 4.

In Step 511, the document classification model is executed to classify the document image and obtain a document label prediction. In one or more embodiments, multimodal features are used to classify the document image. Because the multimodal features include features from text, layout, and image, the input to the document classification model is richer, thereby improving the accuracy of prediction.

In Step 513, the confidence head model, by applying the document label prediction, processes the entities to obtain a result. Step 513 may be performed in a same or similar manner discussed above with reference to Step 409 of FIG. 4.

Figure 6A:
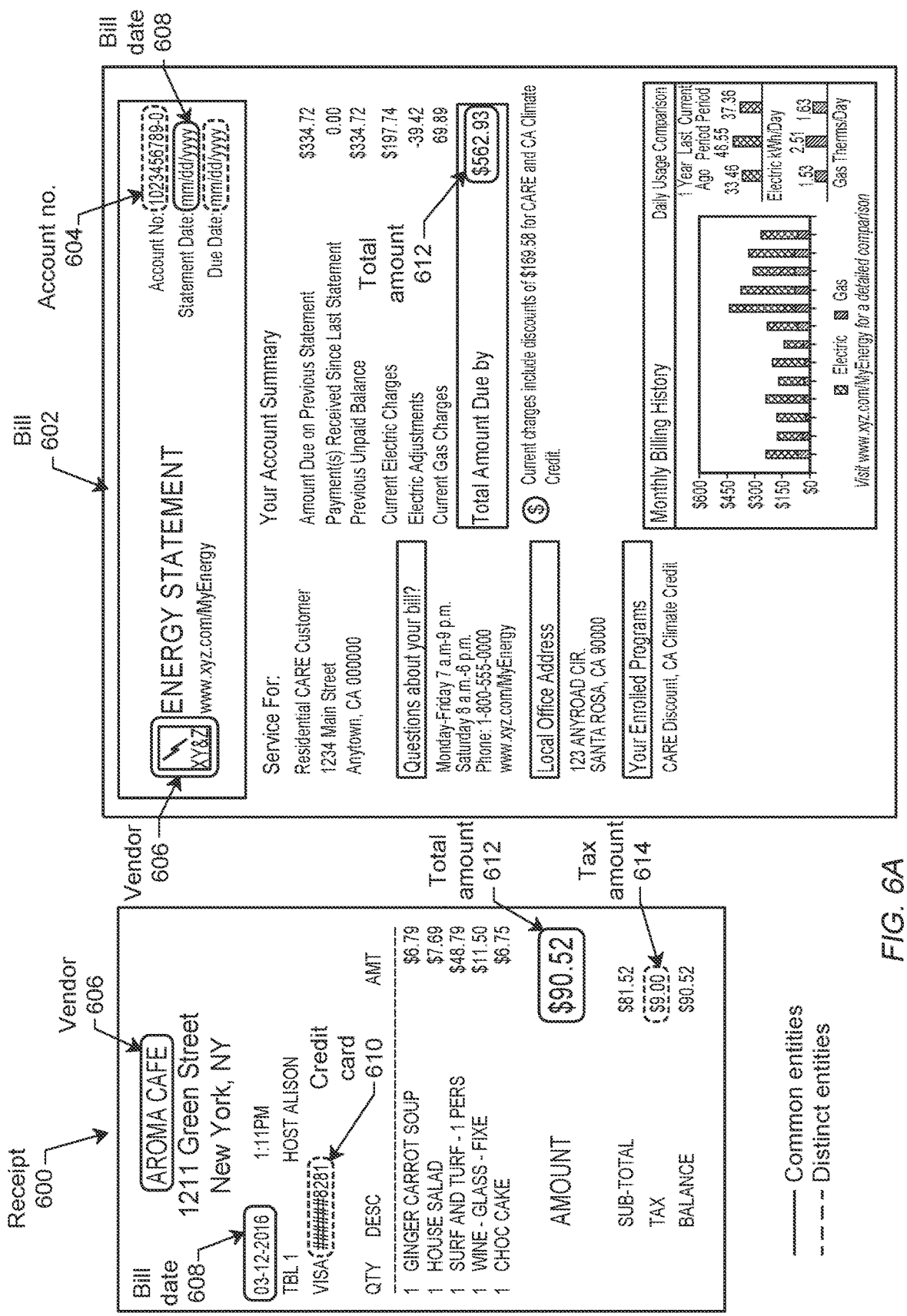
FIGS. 6A, 6B, and 6C show an example in accordance with one or more embodiments.
Figure 6B:
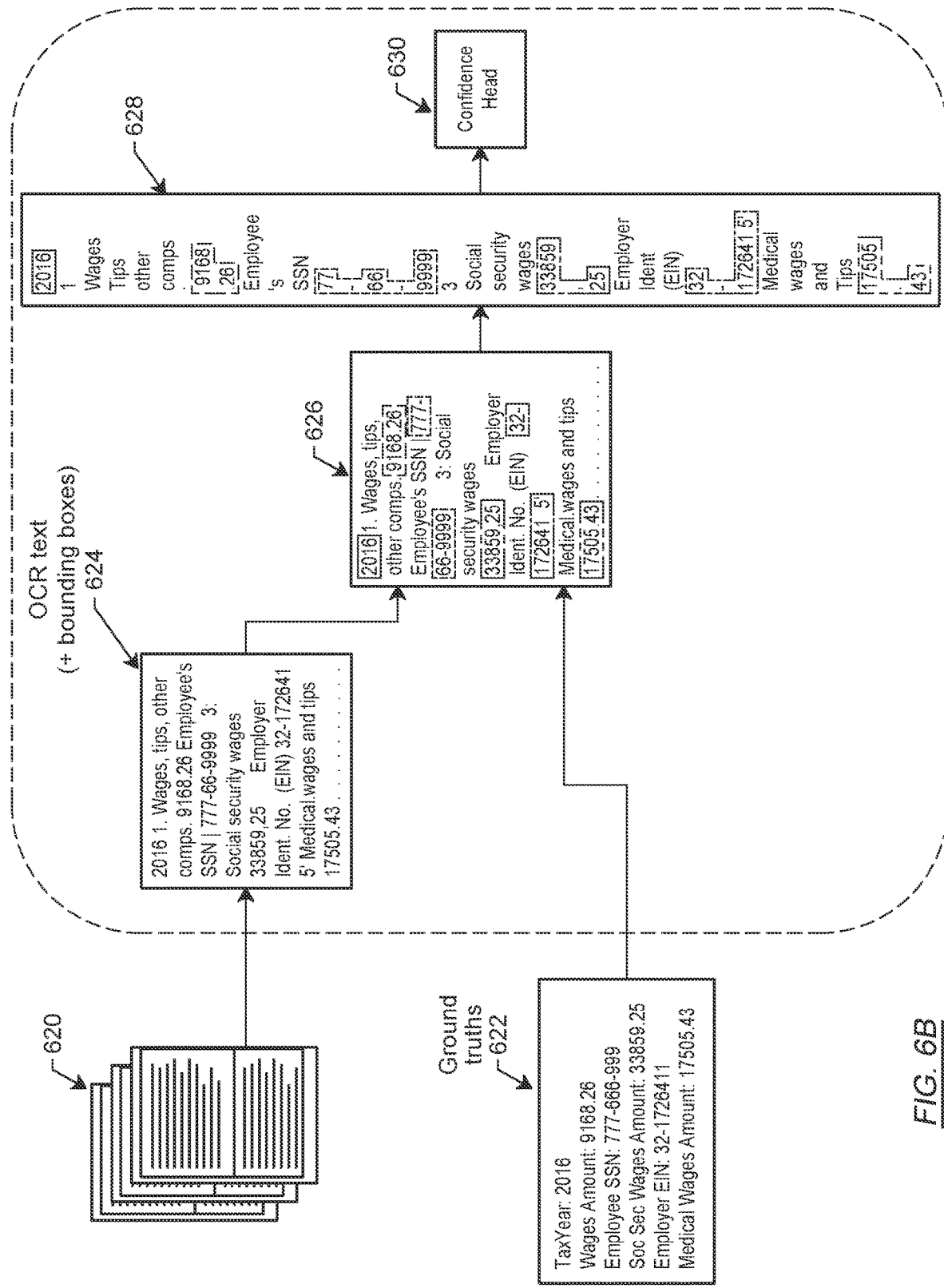
Figure 6C:
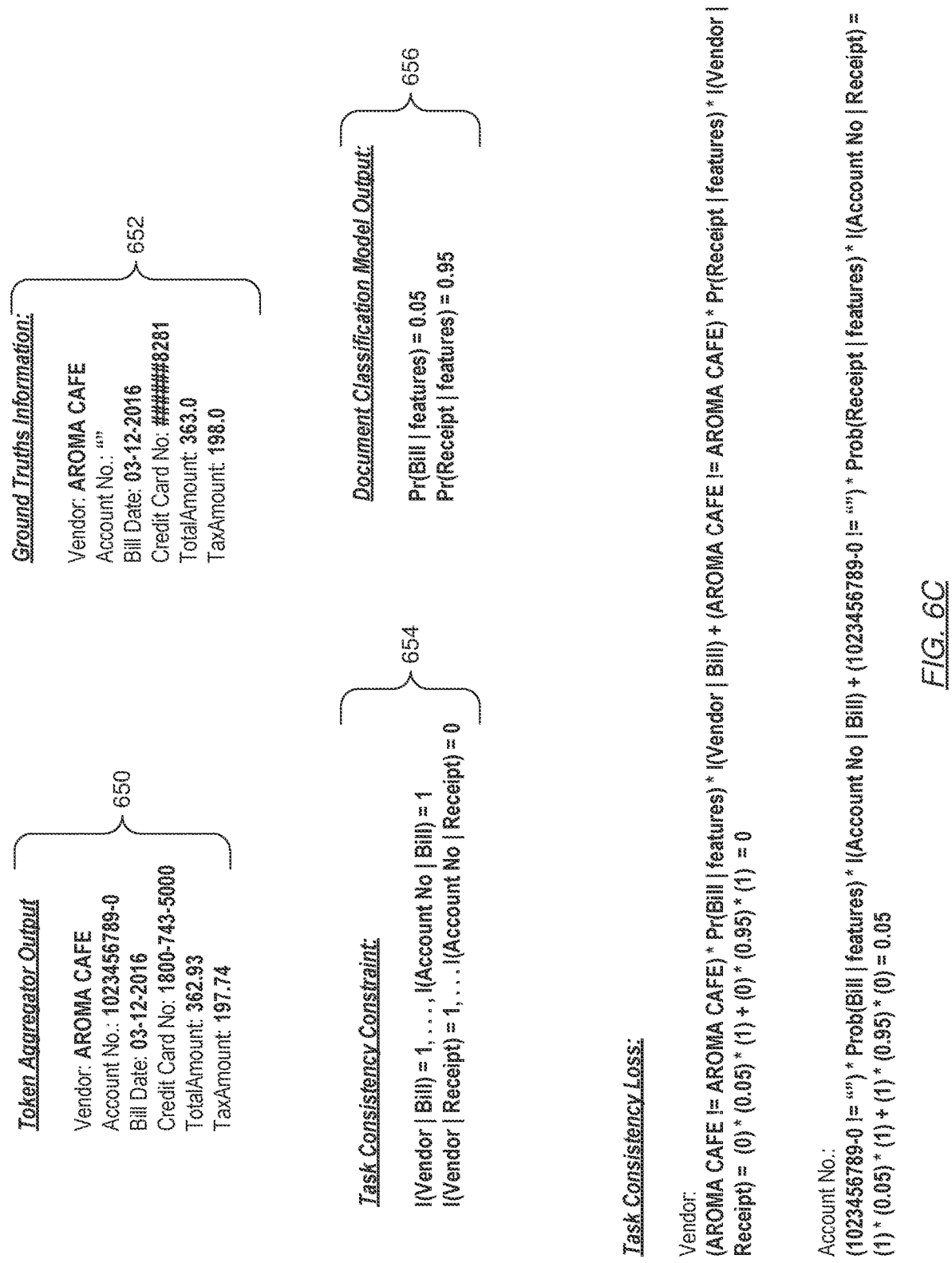

FIG. 6A, FIG. 6B, and FIG. 6C show an example in accordance with one or more embodiments. The following example is for explanatory purposes only and not intended to limit the scope of the invention.

Turning to FIG. 6A, the example includes document images for a receipt (600) and a bill (602). As shown in FIG. 6A, certain entity types are found in both receipts (600) and bills (602). For example, receipts (600) and bills (602) may both have a vendor (606), a bill date (608), and a total amount (612). Other entities are in either receipts (600) or bills (602), but not both. For example, account number (604) may be in a bill (602) and not a receipt (600). Conversely, credit card number (610) and tax amount (614) may be in a receipt (600) and not a bill (602). One or more embodiments allow for processing both types of documents through a single framework and accounting for the document type only after the entities are extracted and labeled.

FIG. 6B shows an example schematic diagram for processing the documents in accordance with one or more embodiments. In the example shown in FIG. 6B, document images (620) and ground truth information (622) are used to train the system. The document images (620) are passed through an OCR engine to obtain OCR text and bounding boxes (624). Through a tokenization process (626), individual token values are identified. Further, the token extraction head generates classified tokens (628) from the extracted token values. The extraction head loss function uses the ground truth information (622) to generate an extraction loss based on whether the tokens are correctly labeled in the classified tokens. As shown in box (628), tokens belonging to the same entity, such as the different digits of monetary amounts "9168" and "0.26", and "17505" and "0.43", are separately labeled and are individual tokens. Based on adjacency and rules about monetary amounts, the tokens may be grouped into entities "17505.43" and "9168.26" and labeled with entity labels "MedicalWagesAmount" and "WagesAmount", respectively. The entities are passed to a confidence head to determine task consistency loss.

FIG. 6C shows an example of task consistency confidence loss calculation. As shown in FIG. 6C, the token aggregator output (650) in the example includes a vendor, account number, bill date, credit card number, and total and tax amounts. The ground truth information (652) includes a vendor, account number, bill date, credit card number, total amount, and tax amount.

The system also has task consistency constraints (654) that a vendor is on a bill and a receipt while an account number is on a bill and not on a receipt. The document classification model output (656) is that the document has a five percent chance of being a bill and a ninety-five percent chance of being a receipt.

Turning to the task consistency loss for the vendor entity (658) and the receipt entity (660), the following calculations are performed. To calculate task consistency loss for the vendor entity (658), the calculation is: "(AROMA CAFE!=AROMA CAFE)*Pr(Bill|features)*I(Vendor|Bill)+ (AROMA CAFE!=AROMA CAFE)*Pr(Receipt|features)*I (Vendor|Receipt). Using the numbers shown in FIG. 6C, the calculation is: "(0)*(0.05)*(1)+(0)*(0.95)*(1)=0".

To calculate the task consistency loss for the account number (660), the following calculation is performed: "(1023456789-0!=" ")*Prob(Bill|features)*I(Account No|Bill)+(1023456789-0!=" ")*Prob(Receipt|features)*I (Account No|Receipt)". Using the numbers shown in FIG. 6C, the calculation is: (1)*(0.05)*(1)+(1)*(0.95)*(0)=0.05. Because an account number is not on a receipt, the task consistency loss for the second term evaluates to "0", and does not contribute to the total loss. Thus, the entity of account number is effectively filtered out as it only contributes to 0.05 of the total loss.

Figure 7A:
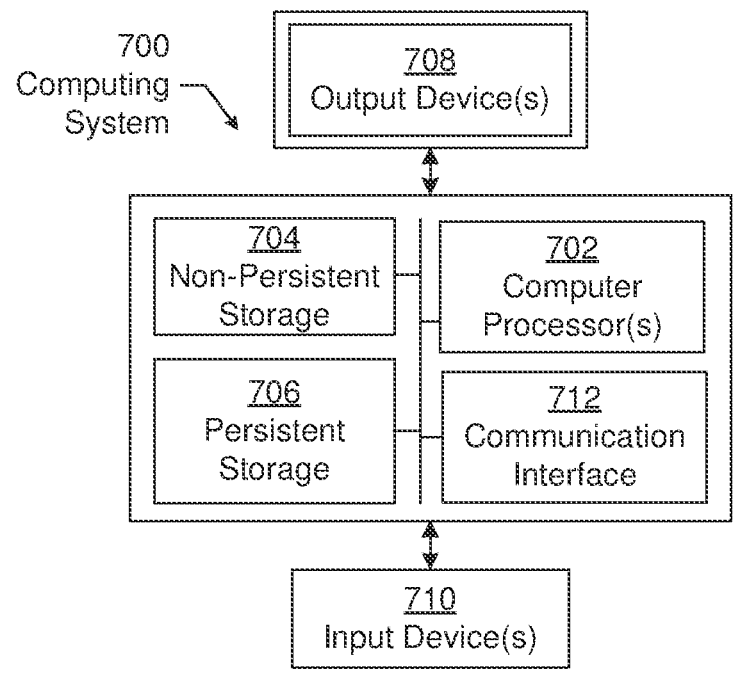
FIGS. 7A and 7B show computing system in accordance with one or more embodiments.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities that implement the features and elements of the disclosure.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
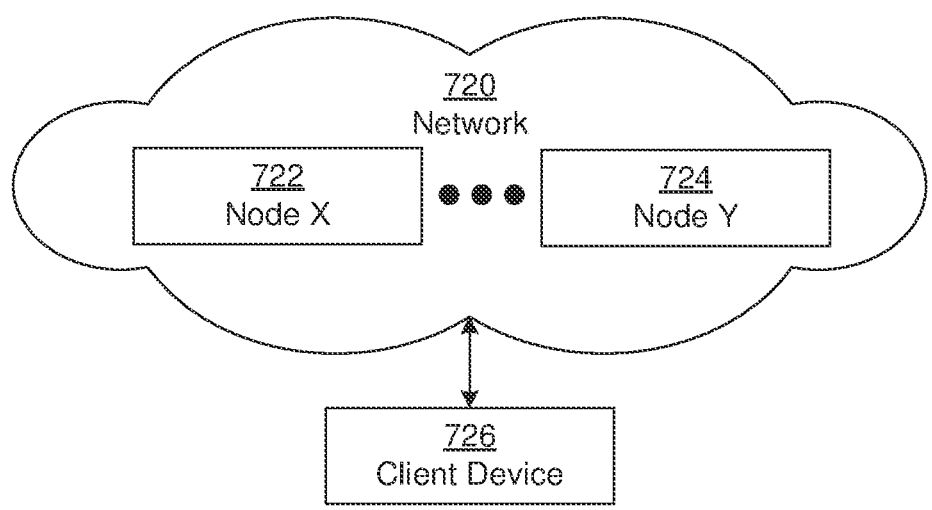

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

The above description of functions presents only a few examples of functions performed by the computing system of FIG. 7A and the nodes and/or client device in FIG. 7B. Other functions may be performed using one or more embodiments of the invention.

Throughout the application, ordinal numbers (e.g., first, second, third, etc.) are used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
processing, by a feature extractor of an arrangement of machine-learning models, a plurality of token values obtained from a document, to obtain a plurality of features;
classifying, using the plurality of features, the plurality of token values by a token extraction head of the arrangement of machine-learning models, to obtain a plurality of classified tokens;
aggregating the plurality of classified tokens into a plurality of entities;
generating a document label prediction based on executing a document classification model on the plurality of features;
processing, by a confidence head of the arrangement of machine-learning models, based on applying the document label prediction, the plurality of entities to obtain a task consistent confidence loss wherein the task consistent confidence loss is a function of parameters comprising a binary cross entropy loss, a document label probability and an indicator function;
jointly optimizing, during training, the arrangement of machine-learning models comprising the feature extractor, the confidence head, and the token extraction head by processing the task consistent confidence loss through the feature extractor, the confidence head, and the token extraction head; and
processing a plurality of documents by the trained arrangement of machine-learning models to extract content comprising entity identifier, entity value pairs from the plurality of documents.

2. The method of claim 1, further comprising:
calculating a cross entropy loss by comparing a training document label with the document label prediction; and
backpropagating the cross entropy loss through the document classification model.

3. The method of claim 1, further comprising:
processing a document image through an optical character recognition (OCR) engine to obtain the plurality of token values, wherein the document comprises the document image.

4. The method of claim 1, further comprising:
obtaining the plurality of token values and a layout of the document; and
processing, by the feature extractor, the layout of the document, and the plurality of token values to obtain a plurality of multimodal features,
wherein the plurality of features comprises the plurality of multimodal features.

5. The method of claim 1, further comprising:
processing a document image through an image embedding model to obtain an image feature vector for the document image, wherein the document is the document image; and
processing, by the feature extractor, the plurality of token values, a layout of the document image, and the image feature vector to obtain a plurality of multimodal features,
wherein the plurality of features comprises the plurality of multimodal features.

6. A system comprising:
an arrangement of machine-learning models, comprising:
 a feature extractor executing on a computer processor for processing a plurality of token values obtained from a document to obtain a plurality of features,
 a token extraction head executing on the computer processor for classifying, using the plurality of features, the plurality of token values to obtain a plurality of classified tokens,
 a token aggregator executing on the computer processor for aggregating the plurality of classified tokens into a plurality of entities,
 a document classification model executing on the computer processor for classifying, using the plurality of features, the document to obtain a document label prediction,
 a confidence head model executing on the computer processor for processing, by applying the document label prediction, the plurality of entities to obtain a task consistent confidence loss, and
 a task consistent loss function executing on the computer processor to calculate the task consistent confidence loss using parameters comprising a binary cross entropy loss, a document label probability, and an indicator function;
wherein the system is configured for:
 jointly optimizing, during training, the arrangement of machine-learning models by processing the task consistent confidence loss through the feature extractor, the confidence head model, and the token extraction head; and
 processing a plurality of documents by the trained arrangement of machine-learning models to extract content comprising entity identifier, entity value pairs from the plurality of documents.

7. The system of claim 6, further comprising:
a document classification loss function configured to calculate a cross entropy loss by comparing a training document label with the document label prediction,
wherein the cross entropy loss is backpropagated through the document classification model.

8. The system of claim 6, further comprising:
an optical character recognition (OCR) engine for obtaining the plurality of token values from a document image, the document comprising the document image.

9. The system of claim 6, further comprising:
an optical character recognition (OCR) engine for obtaining the plurality of token values and a layout from a document image, the document comprising the document image,
wherein the feature extractor processes a layout of the document image, and the plurality of token values to obtain a plurality of multimodal features,
wherein the plurality of features comprises the plurality of multimodal features.

10. The system of claim 6, further comprising:
an image embedding model for processing a document image to obtain an image feature vector for the document image, wherein the document comprises the document image,
wherein the feature extractor processes the image feature vector, a layout of the document image, and the plurality of token values to obtain a plurality of multimodal features,
wherein the plurality of features comprises the plurality of multimodal features.

\* \* \* \* \*